US00RE39254E

(19) United States
(12) Reissued Patent
Von Schroeter et al.

(10) Patent Number: US RE39,254 E
(45) Date of Reissued Patent: Sep. 5, 2006

(54) INVALID LIFTING DEVICE

(75) Inventors: Philip Von Schroeter, Haresfield (GB); John Greaves, Romsey (GB)

(73) Assignee: Arjo. Med. Aktiebolag Limited, Gloucester (GB)

(21) Appl. No.: 10/618,697

(22) Filed: Jul. 15, 2003

Related U.S. Patent Documents

Reissue of:
(64) Patent No.: 6,161,232
Issued: Dec. 19, 2000
Appl. No.: 09/321,723
Filed: May 28, 1999

(30) Foreign Application Priority Data

May 30, 1998 (GB) ..... 9811562

(51) Int. Cl.
*A61G 7/14* (2006.01)

(52) U.S. Cl. ..... 5/86.1; 5/83.1
(58) Field of Classification Search ..... 5/86.1, 5/83.1, 81.1 R
See application file for complete search history.

(56) References Cited

U.S. PATENT DOCUMENTS

| | | | |
|---|---|---|---|
| 2,234,483 | A | 3/1941 | Sutton |
| 2,498,853 | A | 2/1950 | Hassold et al. |
| 2,666,930 | A | 1/1954 | Lenahan |
| 3,099,020 | A | 7/1963 | Garfield et al. |
| 3,820,176 | A | 6/1974 | Feiertag |
| 4,719,655 | A | 1/1988 | Dean |
| 4,939,801 | A | 7/1990 | Schaal et al. |
| 5,423,562 | A | 6/1995 | Pearce, Jr. |
| 5,853,015 | A | 12/1998 | Evans |
| 6,047,418 | A | 4/2000 | Seide et al. |

FOREIGN PATENT DOCUMENTS

| | | |
|---|---|---|
| EP | 0 424 344 | 4/1991 |
| GB | 323921 | 1/1929 |
| GB | 1159776 | 7/1969 |
| GB | 2 184 706 | 7/1987 |
| GB | 2 306 941 | 5/1997 |
| GB | 2 327 931 | 2/1999 |
| GB | 2 337 030 | 11/1999 |
| WO | WO 95/12514 | 5/1995 |

*Primary Examiner*—Alexander Grosz
(74) *Attorney, Agent, or Firm*—Young & Thompson

(57) ABSTRACT

The invalid lifting device comprises a first mast upstanding from a first elongate chassis member and a second mast upstanding from a second elongate chassis member which is parallel or substantially parallel to the first chassis member. The lifting device also comprises a lifting arm supported by and extending between the first and second masts, the lifting arm comprising two parts pivotable relative to one another so that the distance between the masts can be varied. One part is supported by the first mast and the other part is supported by the second mast. Power operated means are provided for moving the two chassis members towards and away from one another. Each part of the lifting arm comprises a parallelogram linkage to maintain the chassis members in parallel or substantially parallel relationship as the two chassis members are moved towards and away from one another. Each mast may be telescopically extendible/retractable and power operated means may be provided for extending and retracting the two masts in synchronism with one another.

11 Claims, 5 Drawing Sheets

INVALID LIFTING DEVICE

Matter enclosed in heavy brackets [ ] appears in the original patent but forms no part of this reissue specification; matter printed in italics indicates the additions made by reissue.

SUMMARY OF THE INVENTION

According to a first aspect of the invention there is provided an invalid lifting device comprising a first mast upstanding from a first elongate chassis member, a second mast upstanding from a second elongate chassis member which is parallel or substantially parallel to the first chassis member, a lifting arm supported by and extending between the first and second masts, the lifting arm comprising two parts pivotable relative to one another so that the distance between the masts can be varied, one part being supported by the first mast and the other part being supported by the second mast, and power operated means for moving the two chassis members towards and away from one another, wherein each part of the lifting arm comprises a parallelogram linkage to maintain the chassis members in parallel or substantially parallel relationship as the two chassis members are moved towards and away from one another.

According to a second aspect of the invention there is provided an invalid lifting device comprising a first telescopically extendible/extractable mast upstanding from a first elongate chassis member, a second telescopically extendible/retractable mast upstanding from a second elongate chassis member, each mast having an upper part and a lower part, a lifting arm supported by and extending between the first and second masts, and power operated means for extending and retracting the first and second masts in synchronism with one another.

The invention will now be more particularly described, by way of example, with reference to the accompanying drawings.

DESCRIPTION OF THE PREFERRED EMBODIMENTS

Figure 1:
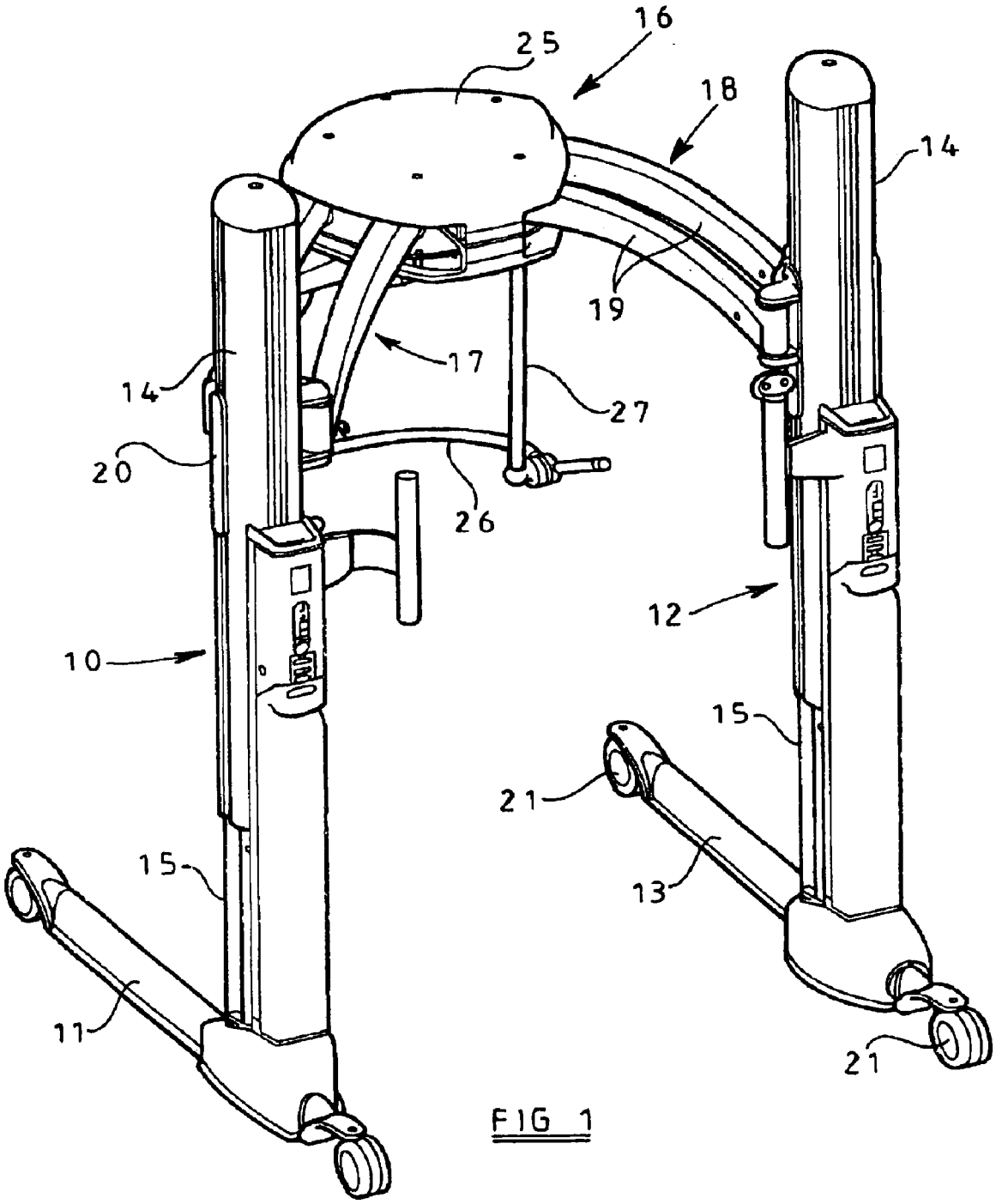
FIG. 1 is a perspective view of one embodiment of an invalid lifting device according to the first and second aspects of the present invention.
Figure 2:
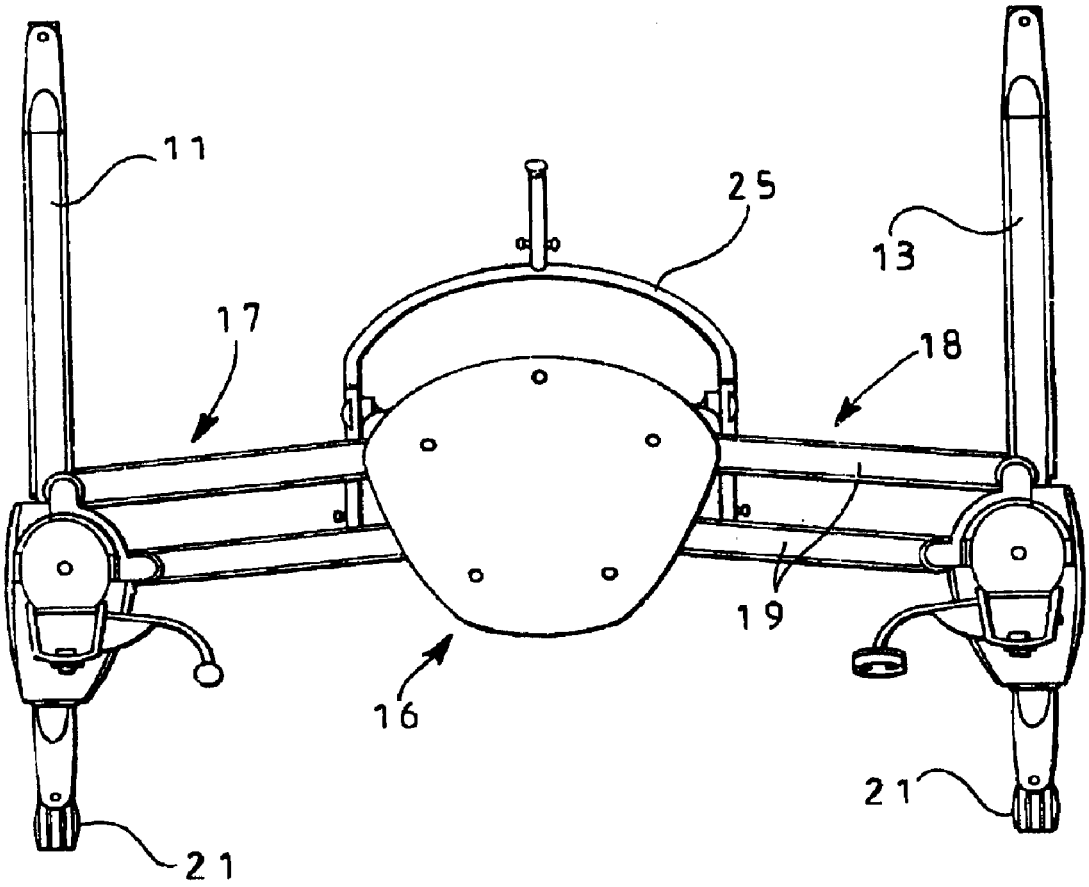
FIG. 2 is a plan view of the lifting device of FIG. 1 showing the chassis fully open.

Referring firstly to FIGS. 1 to 4 of the drawings, the invalid lifting device shown therein comprises a first telescopically extendible/retractable mast 10 upstanding from a first elongate chassis member 11 and a second telescopically extendible/retractable mast 12 upstanding from a second elongate chassis member 13. Each mast has an upper part 14 and a lower part 15.

A lifting arm 16 is supported by and extends between the upper parts 14 of the first and second masts 10 and 12, respectively. The lifting arm 16 comprises two parts 17 and 18 pivotable relative to one another in a horizontal plane. The part 17 is supported by the upper part 14 of the first mast 10 and the part 18 is supported by the upper part 14 of the second mast 12. The lifting arm 16 is the sole means connecting the first mast 10 and chassis member 11 to the second mast 12 and chassis member 13.

Each part 17 and 18 of the lifting arm comprises a parallelogram linkage 19, to maintain the chassis members 11 and 12 in parallel spaced relationship as the two parts 17 and 18 of the arm 16 pivot relative to one another, and a carriage 20 which is mounted on the upper part 14 of the mast.

As shown in FIG. 1, the upper mast parts 14 telescope over the lower mast parts 15. In this case, the carriages 20 can be raised or lowered relative to the upper mast parts 14 in addition to being raised and lowered by relative movement of the two mast parts 14, 15 to increase the overall lifting range of the lifting device.

The upper part 14 of each mast 10, 12 can be raised or lowered relative to the lower part 15 of each mast 10, 12 and the carriages 20 can be raised or lowered relative to the upper mast parts 14 by a mechanism such as is described in EP-A-0424344.

Each chassis member 11, 13 is provided with two castors 21.

The end of one arm of each parallelogram linkage 19 remote from the mast 10, 12 has a worm wheel gear 22. The two worm gears 22 are rotated in synchronism by a worm 23 rotated by a motor 24.

Figure 4:
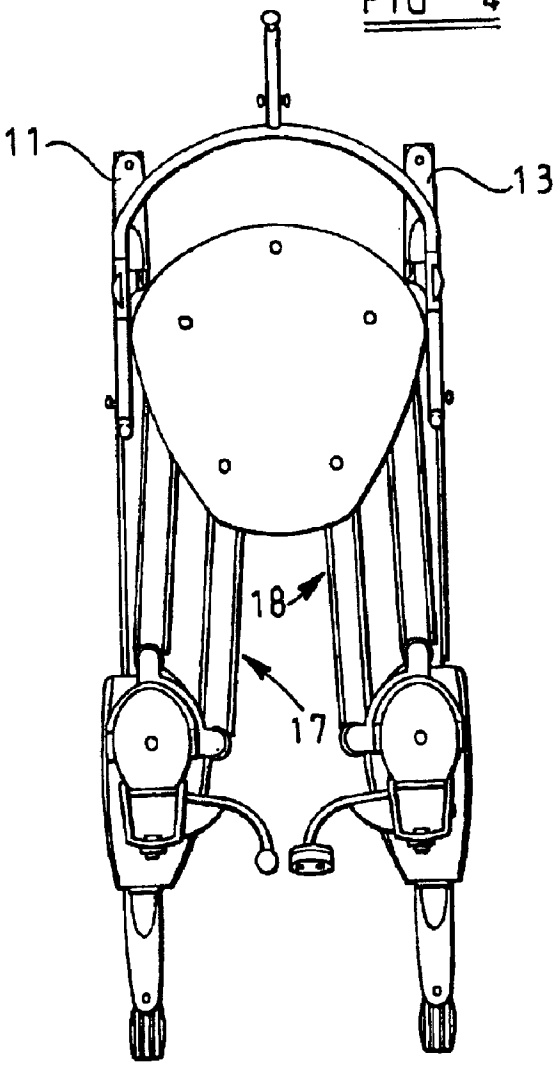
FIG. 4 is a plan view of the lifting device with the chassis in a parked condition.
Figure 3:
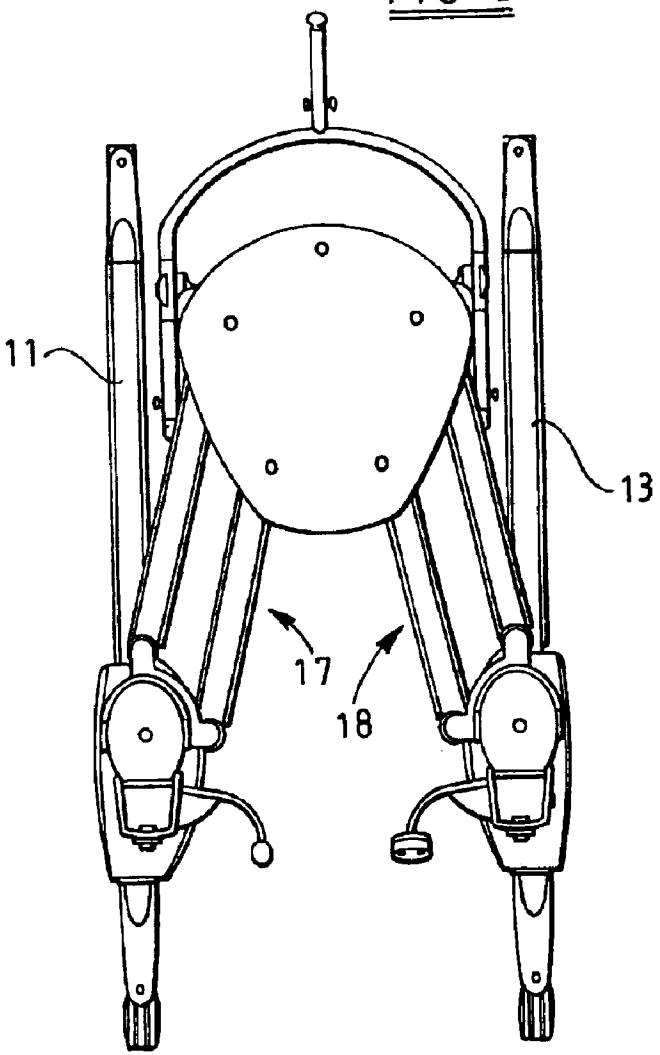
FIG. 3 is a plan view of the lifting device with the chassis in its narrowest safe operating condition.
Figure 5:
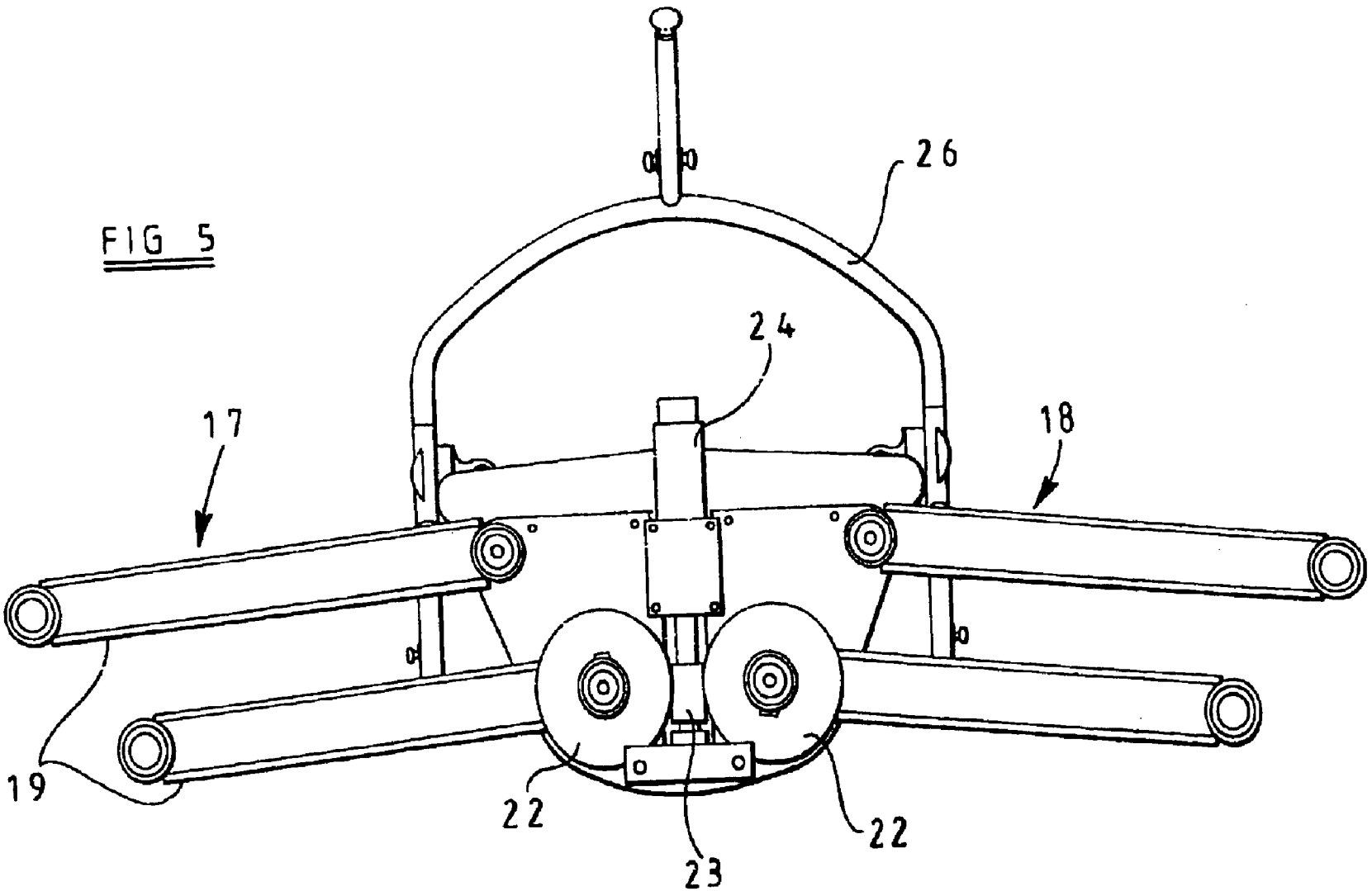
FIG. 5 is a plan view of the lifting arm with the housing removed.

The worm gears 22, worm 23 and motor 24 are all accommodated within a housing 25. It is possible by rotating the worm gears 22 to move the chassis members 11 and 13 towards or away from one another in order to widen or narrow the chassis. When in its widest condition (FIG. 2), the lifting device will straddle obstacles such as a single bed and each part 17, 18 of the lifting arm 16 is typically at an angle of or about 85° to a line extending fore and aft of the lifting device, although the angle could be 90°. FIG. 3 shows the chassis in its narrowest safe operating condition. In this condition each part 17, 18 of the lifting arm 16 is typically at an angle of about 15° to the aforesaid line and the lifting device will easily pass through a doorway. FIG. 4 shows the chassis in a parked condition in which the lifting device occupies minimum floor space. In this case, each part 17, 18 of the lifting arm 16 is typically at an angle of about 4° to the aforesaid line, although the angle could be 0°.

Instead of driving the worm wheel, the chassis members 11 and 13 could be moved towards or away from one another by a chassis drive arrangement as described in our co-pending British Patent Application No. 9806469.4, now published UK Application, GB 2,337,030A, published on Oct. 11, 1999. In this case, the end of one arm of each parallelogram linkage 19 remote from the mast may have a gear which co-operate with one another to ensure that the two parts 17 and 18 of the lifting arm are displaced angularly by equal amounts as the two parts pivot relative to one another. A brake may co-operate with the other arm of each parallelogram linkage 19 to releasably lock the two parts 17 and 18 in a fixed angular position relative to one another.

A sling hanger 26 for supporting a full body sling is suspended from the lifting arm 16 by a sling hanger support 27. The sling hanger 26 is pivotable relative to the sling hanger support 27 about a horizontal axis. The sling hanger 26 and sling hanger support 27 may be of the type described in GB 2184706 or may be a motorised version such as is described in GB 2327931.

The sling hanger 26 and sling hanger support 27 may be replaced by a stretcher support, or by a walking harness, or by a winch.

Figure 6:
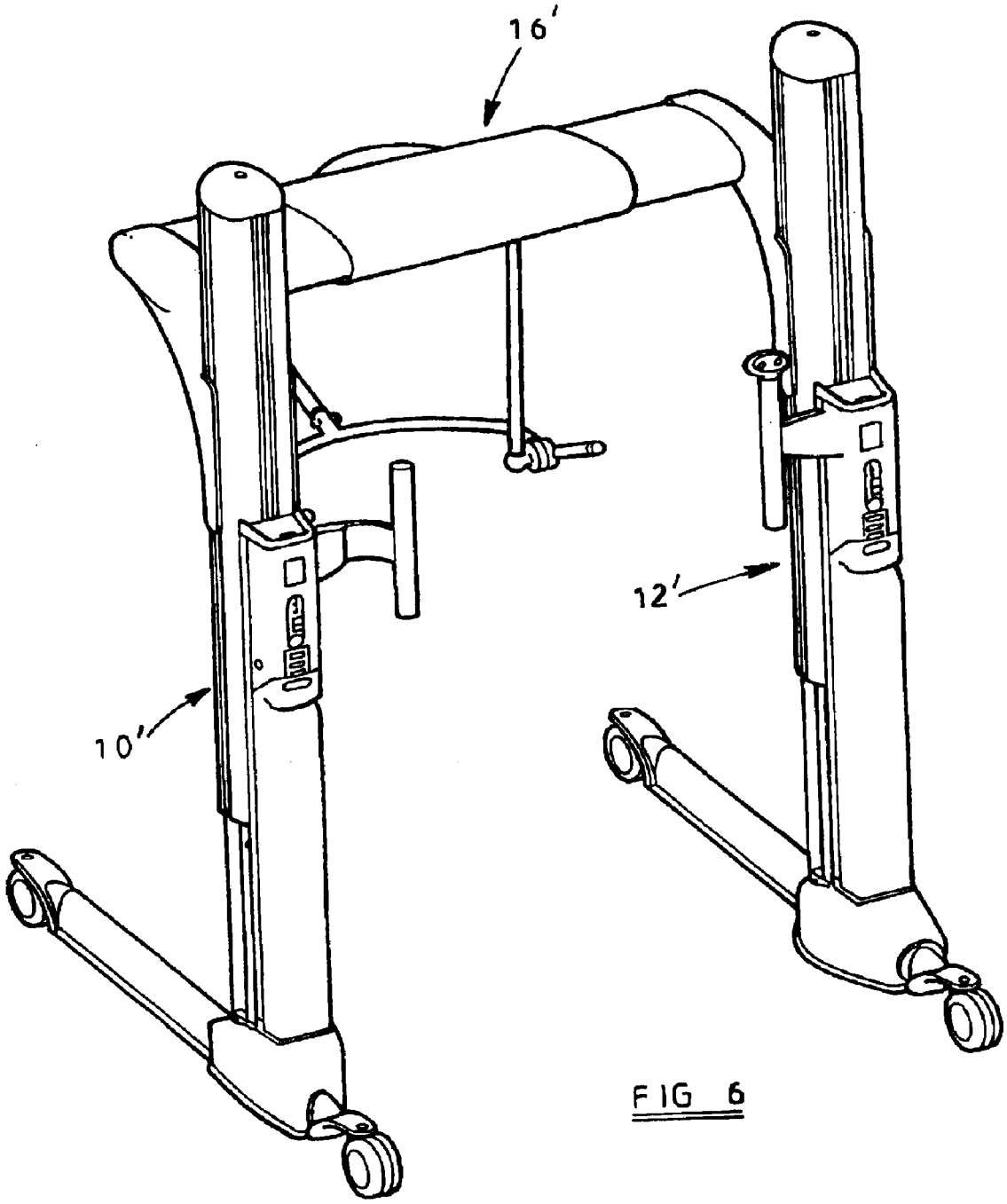
FIG. 6 is a perspective view of another embodiment of an invalid lifting device according to the second aspect of the invention.

Referring now to FIG. 6 of the drawings, the lifting arm 16' is telescopically extendible and retractable, rather than having two parts pivotable relative to one another, so that the distance between the masts 10', 12' can be varied. A linear actuator could be provided to extend and retract the lifting arm 16'.

The embodiments described above are given by way of example only and various modifications will be apparent to persons skilled in the art without departing from the scope of the invention. For example the masts need not be extendible and retractable. Each mast could be a single part mast with a carriage movable up and down the mast.

What is claimed is:

1. An invalid lifting device comprising a first mast upstanding from a first elongate chassis member, a second mast upstanding from a second elongate chassis member which is parallel or substantially parallel to the first chassis member, a lifting arm supported by and extending between the first and second masts, the lifting arm comprising two parts pivotable relative to one another so that the distance between the masts can be varied, one part being supported by the first mast and the other part being supported by the second mast, and power operated means for moving the two chassis members towards and away from one another, wherein each part of the lifting arm comprises a parallelogram linkage to maintain the chassis members in parallel or substantially parallel relationship as the two chassis members are moved towards and away from one another.

2. An invalid lifting device as claimed in claim 1, wherein the power operated means is provided on or in the lifting arm for pivoting the two parts of the lifting arm relative to one another.

3. An invalid lifting device as claimed in claim 1, wherein each mast is telescopically extendible/retractable.

4. An invalid lifting device as claimed in claim 3, wherein the lifting arm is raised and lowered solely by extending and retracting the first and second masts.

5. An invalid lifting device as claimed in claim 3, wherein the lifting arm can be raised or lowered relative to the first and second masts in addition to being raised or lowered by relative movement of the two mast parts.

6. An invalid lifting device as claimed in claim 1, wherein the lifting arm is the sole means connecting the first mast and chassis member to the second mast and chassis member.

[7. An invalid lifting device comprising a first telescopically extendible/retractable mast upstanding from a first elongate chassis member, a second telescopically extendible/retractable mast upstanding from a second elongate chassis member, each mast having an upper part and a lower part, a lifting arm supported by and extending between the first and second masts, wherein the lifting arm is the sole means connecting the first mast and chassis member to the second mast and chassis member.]

[8. An invalid lifting device as claimed in claim 7, wherein the lifting arm maintains the two chassis members in parallel or substantially parallel relationship.]

[9. An invalid lifting device as claimed in claim 7, wherein the lifting arm can be raised or lowered relative to the masts.]

[10. An invalid lifting device as claimed in claim 7, wherein the lifting arm comprises two parts pivotable relative to one another about a vertical or substantially vertical axis, one part being supported by the first mast and the other part being supported by the second mast.]

[11. An invalid lifting device as claimed in claim 10, wherein each part of the lifting arm comprises a parallelogram linkage to maintain the chassis members in parallel spaced relationship as the two parts of the arm pivot relative to one another.]

[12. An invalid lifting device as claimed in claim 10, wherein a motor is provided on or in the lifting arm for pivoting the two parts of the lifting arm relative to one another.]

[13. An invalid lifting device as claimed in claim 7, wherein the lifting arm is telescopically extendible and retractable so that the distance between the chassis members can be varied.]

[14. An invalid lifting device as claimed in claim 13, wherein a linear actuator is provided to extend and retract the lifting arm to thereby draw the masts towards one another or move them further apart.]

15. An invalid lifting device comprising a first telescopically extendible/retractable mast upstanding from a first elongate chassis member, a second telescopically extendible/retractable mast upstanding from a second elongate chassis member, each mast having an upper part and a lower part, a lifting arm supported by and extendible between the first and second masts, wherein the lifting arm comprises two parts pivotable relative to one another about a vertical or substantially vertical axis, one part being supported by the first mast and the other part being supported by the second mast.

16. The invalid lifting device of claim 15, wherein each part of the lifting arm comprises a parallelogram linkage to maintain the chassis members in parallel spaced relationship as the two parts of the arm pivot relative to one another.

17. The invalid lifting device of claim 15, wherein a motor is provided on or in the lifting arm for pivoting the two parts of the lifting arm relative to one another.

18. An invalid lifting device comprising a first telescopically extendible/retractable mast upstanding from a first elongate chassis member, a second telescopically extendible/retractable mast upstanding from a second elongate chassis member, each mast having an upper part and a lower part, a lifting arm supported by and extending between the first and second masts, wherein the lifting arm is telescopically extendible and retractable so that the distance between the chassis members can be varied.

19. The invalid lifting device of claim 18, wherein a linear actuator is provided to extend and retract the lifting arm to thereby draw the masts toward one another or move them further apart.

* * * * *